United States Patent
Inoue et al.

(10) Patent No.: US 9,597,808 B2
(45) Date of Patent: Mar. 21, 2017

(54) JOINT STRUCTURE CAPABLE OF OPTIMIZING MARGIN OF LENGTH OF UMBILICAL MEMBER, AND INDUSTRIAL ROBOT HAVING THE JOINT STRUCTURE

(71) Applicant: FANUC CORPORATION, Minamitsuru-gun, Yamanashi (JP)

(72) Inventors: Toshihiko Inoue, Yamanashi (JP); Shunsuke Abiko, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/881,816

(22) Filed: Oct. 13, 2015

(65) Prior Publication Data

US 2016/0101528 A1 Apr. 14, 2016

(30) Foreign Application Priority Data

Oct. 14, 2014 (JP) .................................. 2014-210172

(51) Int. Cl.
| | |
|---|---|
| *B25J 17/00* | (2006.01) |
| *B25J 17/02* | (2006.01) |
| *B25J 18/00* | (2006.01) |
| *B25J 19/00* | (2006.01) |
| *B25J 9/10* | (2006.01) |

(52) U.S. Cl.
CPC ........... *B25J 19/0025* (2013.01); *B25J 9/101* (2013.01); *Y10S 901/11* (2013.01); *Y10S 901/28* (2013.01)

(58) Field of Classification Search
CPC ...... B25J 19/0025; B25J 9/101; B25J 9/1005; B25J 19/0029; B25J 19/0041; B25J 19/0004; B25J 18/00; B25J 17/0241; Y10T 74/20311
See application file for complete search history.

(56) References Cited

U.S. PATENT DOCUMENTS

| | | | | |
|---|---|---|---|---|
| 3,885,678 | A | * 5/1975 | Borg | ........................ B23Q 7/04 414/618 |
| 4,507,042 | A | * 3/1985 | Suzuki | .................... B23K 9/287 248/201 |
| 4,780,045 | A | * 10/1988 | Akeel | .................. B25J 19/0029 182/2.8 |

(Continued)

FOREIGN PATENT DOCUMENTS

| | | |
|---|---|---|
| JP | 60025677 A | 2/1985 |
| JP | 61117082 A | 6/1986 |

(Continued)

Primary Examiner — William Kelleher
Assistant Examiner — Jake Cook
(74) Attorney, Agent, or Firm — RatnerPrestia

(57) ABSTRACT

A joint structure capable of optimizing a margin of length of an umbilical member corresponding to a motion range of a forearm, and an industrial robot having the joint structure. At an upper section (near the forearm) of an upper arm, a frame constituting the upper arm has an opening through which the umbilical member can be inserted, and the umbilical member 28 inserted from the opening into a space (or containing section) within the upper arm. By virtue of such a containing section, even when the motion range of the forearm is changed, an operator can adjust (optimize) the margin of length of the umbilical member required for the motion of the forearm.

6 Claims, 5 Drawing Sheets

(56) References Cited

U.S. PATENT DOCUMENTS

| | | | | |
|---|---|---|---|---|
| 5,193,658 | A * | 3/1993 | Tellden | B25J 9/101 192/138 |
| 5,437,207 | A * | 8/1995 | Zimmer | B23K 11/318 414/918 |
| 6,431,018 | B1 * | 8/2002 | Okada | B25J 19/0025 248/229.22 |
| 2002/0007692 | A1 * | 1/2002 | Albertsson | B25J 19/0025 74/490.02 |
| 2002/0158171 | A1 | 10/2002 | Karlinger | |
| 2005/0072261 | A1 * | 4/2005 | Okada | B25J 19/0029 74/490.01 |
| 2009/0166478 | A1 * | 7/2009 | Choi | B25J 19/0025 248/51 |
| 2010/0038495 | A1 * | 2/2010 | Jinushi | B25J 19/0025 248/68.1 |

FOREIGN PATENT DOCUMENTS

| | | |
|---|---|---|
| JP | 02078291 U1 | 6/1990 |
| JP | 04201193 | 7/1992 |
| JP | 04112793 U1 | 9/1992 |
| JP | 07136972 | 5/1995 |
| JP | 2002-239968 A | 8/2002 |
| JP | 2003-225883 A | 8/2003 |
| JP | 2007015057 | 1/2007 |
| JP | 2010-089186 | 4/2010 |
| JP | 2012101324 | 5/2012 |
| JP | 2013111718 | 6/2013 |

* cited by examiner

JOINT STRUCTURE CAPABLE OF OPTIMIZING MARGIN OF LENGTH OF UMBILICAL MEMBER, AND INDUSTRIAL ROBOT HAVING THE JOINT STRUCTURE

BACKGROUND OF THE INVENTION

1. Field of the Invention

The preset invention relates to a joint structure capable of optimizing a margin of length of an umbilical member, and an industrial robot having the joint structure.

2. Description of the Related Art

In an industrial robot having an upper arm, a forearm rotatably connected to the upper arm, and a wrist element rotatably attached to the forearm, there are two motion patterns, i.e., one pattern in which a rotation center of the forearm is positioned above a straight line connecting rotation centers of the upper arm and the wrist element, and another pattern in which the rotation center of the forearm is positioned below the straight line connecting the rotation centers of the upper arm and the wrist element. Recently, in order to obtain as wide a motion range at the rear side of the robot as possible, a range of rotation angle of the forearm relative to the upper arm is often expanded so that both the above two motion patterns can be used.

As a relevant prior art document, for example, JP 2003-225883 A discloses a configuration in which a plastic outer cable guide 20 is arranged at a cable insert hole 10b having an elongated shape, a plastic inner cable holder 21 for holding a cable 7 is supported in outer cable guide 20 so as to slide in the circumferential direction, and inner cable holder 21, downwardly extending from outer cable guide 20, is positioned at a height corresponding to a connecting portion 8a of a frame 8.

JP 2002-239968 A discloses a configuration having a second arm 14 and a third arm 15, in which a movable first stopper 35 abuts a fixed first stopper 37 when third arm 15 is clockwise rotated, a movable second stopper 36 abuts a fixed second stopper 38 when third arm 15 is counterclockwise rotated, and fixed first stopper 37 and fixed second stopper 38 are arranged on a housing 31 of second arm 14 at positions deviated in both the radial and circumferential directions.

Further, JP 2010-089186 A discloses a robot controller configured to prevent erroneous setting of a movable range of a physical stopper relative to a movable control range of software control, and to set a plurality of movable control ranges within a predetermined movable range of an arm.

In an industrial robot, an umbilical member extending from a robot controller is normally connected to a motor for controlling each axis of the robot. In this case, the length and the position of the (movable) umbilical member about a joint between the upper arm and the forearm are determined so that a stress generated in the umbilical member is within an allowable range even when the upper arm is operated with a relatively wide motion range. Therefore, the umbilical member may widely and outwardly slack in the lateral direction.

On the other hand, the actual robot is not normally operated in the state in which the rotation center of the forearm is positioned below the straight line connecting rotation centers of the upper arm and the wrist element. In such a state, it is desired that the motion range of the forearm be limited so that the length of the umbilical member extending outwardly in the lateral direction is reduced.

SUMMARY OF THE INVENTION

Therefore, an object of the present invention is to provide a joint structure capable of optimizing a margin of length (an outwardly slacking length) of the umbilical member, corresponding to a motion range of a forearm, and an industrial robot having the joint structure.

According one aspect of the present invention, a joint structure of an industrial robot, the industrial robot comprising: an upper arm; a forearm having a forearm base rotatably connected to the upper arm; and an umbilical member extending from a lateral side of the upper arm and introduced to a lateral side of the forearm base, wherein a motion range of the forearm relative to the upper arm is variable, wherein the umbilical member has a margin of length corresponding to the motion range of the forearm, between the lateral side of the upper and the lateral side of the forearm base, and wherein the umbilical member has a length portion for adjusting the margin of length corresponding to a change in the motion range of the forearm, the length portion being contained in or held by the upper arm or the forearm base, is provided.

In a preferred embodiment, the joint structure comprises a first fixing member which fixes the umbilical member to an upper section of the lateral side of the upper arm, and a second fixing member which fixes the umbilical member to the lateral side of the forearm base.

In this case, the second fixing member may be configured so that at least one of a position and orientation of the second fixing member relative to the forearm base can be adjusted.

In a preferred embodiment, the joint structure comprises a physical stopper which limits the motion range of the forearm relative to the upper arm, the physical stopper being configured to switch the motion range of the forearm between a first motion range and a second motion range wider than the first motion range.

According to another aspect of the present invention, an industrial robot comprising the above joint structure is provided.

BRIEF DESCRIPTION OF THE DRAWINGS

The above and other objects, features and advantages of the present invention will be made more apparent by the following description of the preferred embodiments thereof, along with reference to the accompanying drawings, wherein.

DETAILED DESCRIPTIONS

Figure 1:
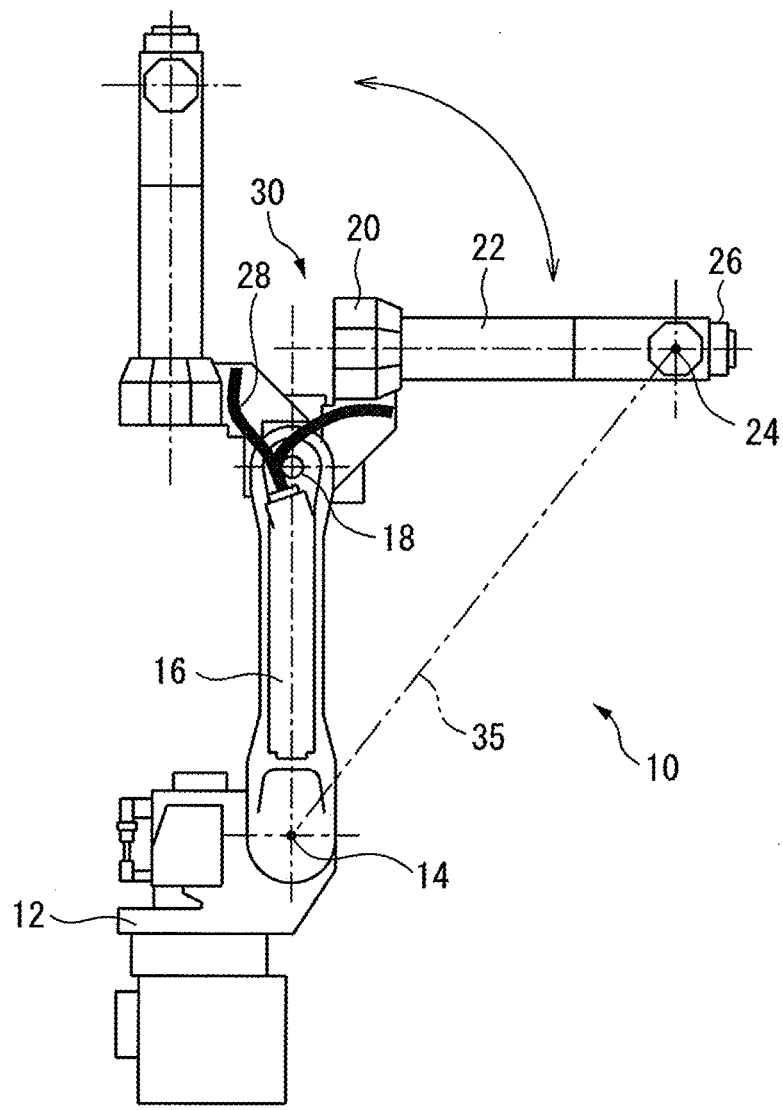
FIG. 1 shows a major section of an industrial robot according to a preferred embodiment of the present invention.

FIG. 1 shows a major section of an industrial robot (hereinafter, also referred to as merely "robot") 10 according to a preferred embodiment of the present invention. For example, robot 10 is a multi-joint robot having six axes. Robot 10 has a base part (not shown) installed on a floor, etc.; a rotating body 12 connected to the base part so as to rotate about a generally vertical axis; an upper arm 16 connected to rotating body 12 so as to rotate about an upper arm rotation axis 14; and a forearm 22 having a forearm base 20 connected to upper arm 16 so as to rotate about a forearm rotation axis 18. A wrist element 26 is attached to a front end of forearm 22 so as to rotate about three axes which intersect with each other at a wrist rotation center 24, and a work tool (not shown) such as a robot hand or a welding torch may be attached to a front end of wrist element 26.

In robot 10, an umbilical 28, constituted by a cable, etc., for supplying power to a motor such as a servomotor for driving each axis (upper arm 16, forearm 22 and wrist element 26, etc.), is arranged so as to extend from a robot controller (not shown) for controlling robot 10 and be connected to each motor. Umbilical member 28 extends from rotating body 12 generally in the longitudinal direction of upper arm 16, is introduced to a lateral side of upper arm 16, extends on or near a lateral side of a connecting portion (or a joint structure) 30 between upper arm 16 and forearm base 20, and is introduced to a lateral side of forearm base 20. Further, umbilical member 28 is arranged so as to have an appropriate margin of length near joint structure 30 (between the lateral side of upper arm 16 and the lateral side of forearm base 20), corresponding to the motion range of forearm 22. For example, the margin of length is determined so that an excess stress is not applied to umbilical member 28 when forearm 22 is moved within the motion range thereof, and so that umbilical member 28 does not widely and outwardly slack from the joint structure.

Figure 2B:
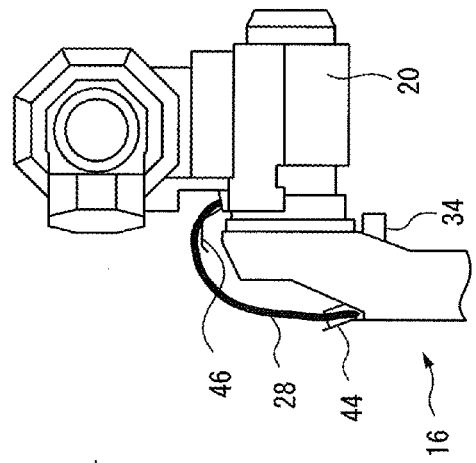
FIGS. 2a to 2c are respectively front, side and top views of a joint structure of the robot of FIG. 1.
Figure 2C:
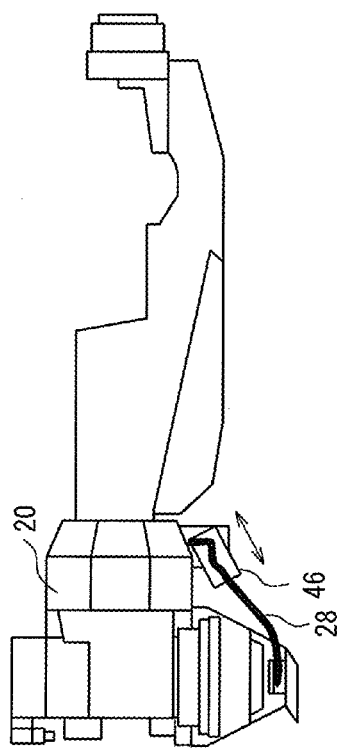
Figure 2A:
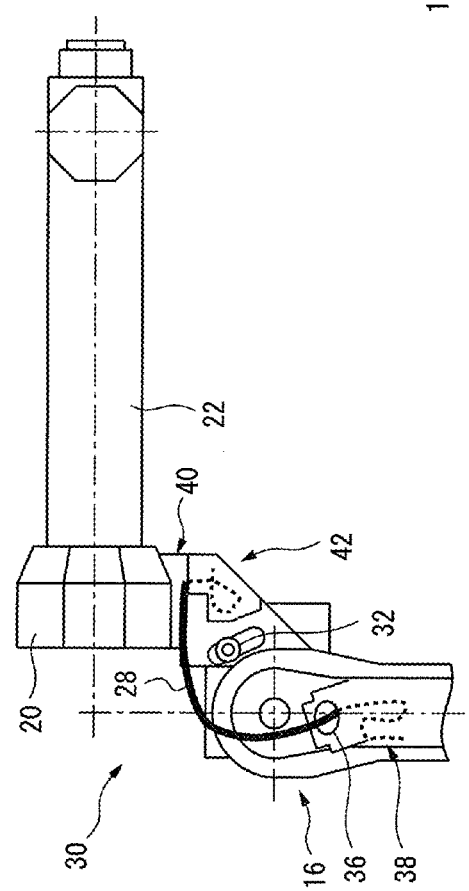

FIGS. 2a to 2c shows a front view (2a), a side view (2b) and a top view (2c) of the joint structure (or the connecting portion between upper arm 16 and forearm 22 (forearm base 20)) of robot 10 as shown in FIG. 1, respectively. At joint structure 30, a physical stopper (or a mechanical stopper), for limiting the motion range (or the range of rotation angle) of forearm 22 relative to upper arm 16, is arranged. Concretely, as shown in FIG. 2a, a first protrusion 32 is arranged on a portion of forearm base 20 near upper arm 16, and a second protrusion 34 is arranged on a portion of upper arm 16 near forearm base 20 (FIG. 2b). the shapes and positions of the first and second protrusions are determined so that the protrusions come into contact with each other when the rotation angle of forearm 22 reaches an upper or lower limit within a predetermined motion range (for example, when the range of rotation angle is between −180 and +180 degrees, the upper and lower limits are +180 degrees and −180 degrees, respectively), whereby forearm 22 cannot rotate over the motion range. In the example of FIGS. 2a to 2c, the motion range of forearm 22 is determined as a first motion range, and the first motion range is narrower than a second motion range determined in an example of FIGS. 3 to 4c as described below.

As explained above, in the example of FIGS. 2a to 2c, the movable range of forearm 22 is determined as the relatively narrow first motion range. Therefore, a margin of length of umbilical member 28 arranged about joint structure 30, required for the motion of forearm 22, may be relatively short. On the other hand, as in the example of FIG. 3 as described below, when the movable range of forearm 22 is determined as the second motion range wider than the first motion range, it is necessary that the margin of length of umbilical member 28 be lengthened corresponding to the second motion range. In this regard, when umbilical member 28 has a relatively large margin of length also in the example of FIGS. 1 to 2c, in case that the motion range is changed from the first motion range to the second motion range, umbilical member 28 may disadvantageously slack from joint structure 30, or may be damaged by being caught or involved in joint structure 30.

In addition, in robot 10 as shown in FIG. 1, rotation center 18 of forearm 22 is positioned above a straight line 35 connecting rotation center 14 of upper arm 16 and rotation center 24 of wrist element 26. Although robot 10 can also be operated while rotation center 18 of forearm 22 is positioned below straight line 35, it is not usual that robot 10 is operated in such a case. Further, in such a case, it is often desired that the motion range of forearm 22 be limited so as to reduce the slacking length of umbilical member 28.

Accordingly, in the present invention, as shown in FIG. 2a, a containing section for containing the length portion of umbilical member 28 so as to adjust the margin of length of the umbilical member is arranged at least one of upper arm 16 and forearm 22 (forearm base 20). For example, at an upper section (near the forearm) of upper arm 16, a frame constituting upper arm 16 has an opening 36 through which the umbilical member can be inserted, and umbilical member 28 is inserted from opening 36 into a space (or containing section 38) within upper arm 16. By virtue of this, a part of the margin of length, required in the example of FIGS. 3 to 4c, can be contained in the space. Similarly, forearm base 20 may have an opening 40 through which umbilical member can be inserted, and a space (or containing section 42) may be arranged so that umbilical member 28 can be inserted in the space via opening 40. By virtue of such containing section(s), even when the motion range of forearm 22 is changed, the operator can adjust (optimize) the margin of length of the umbilical member required for the motion of forearm 22.

In the example of FIGS. 2a to 2c, the means for adjusting the margin of length of umbilical member 28 is explained as the containing section, whereas the present invention is not limited as such. For example, the margin of length required for adjustment can be held on the outer surface (or the lateral side) of upper arm 16 or forearm 22 (forearm base 20), by using a holding member such as a clamp or a cable tie. In this regard, the expression "held" means that the held portion of the umbilical member cannot be moved relative to upper arm 16 or forearm 22. Further, umbilical member 28 is normally formed from a plurality of cables, and the cables may be formed as one composite cable, whereby the operation for adjusting the margin of length of umbilical member 28 can be facilitated.

Figure 3:
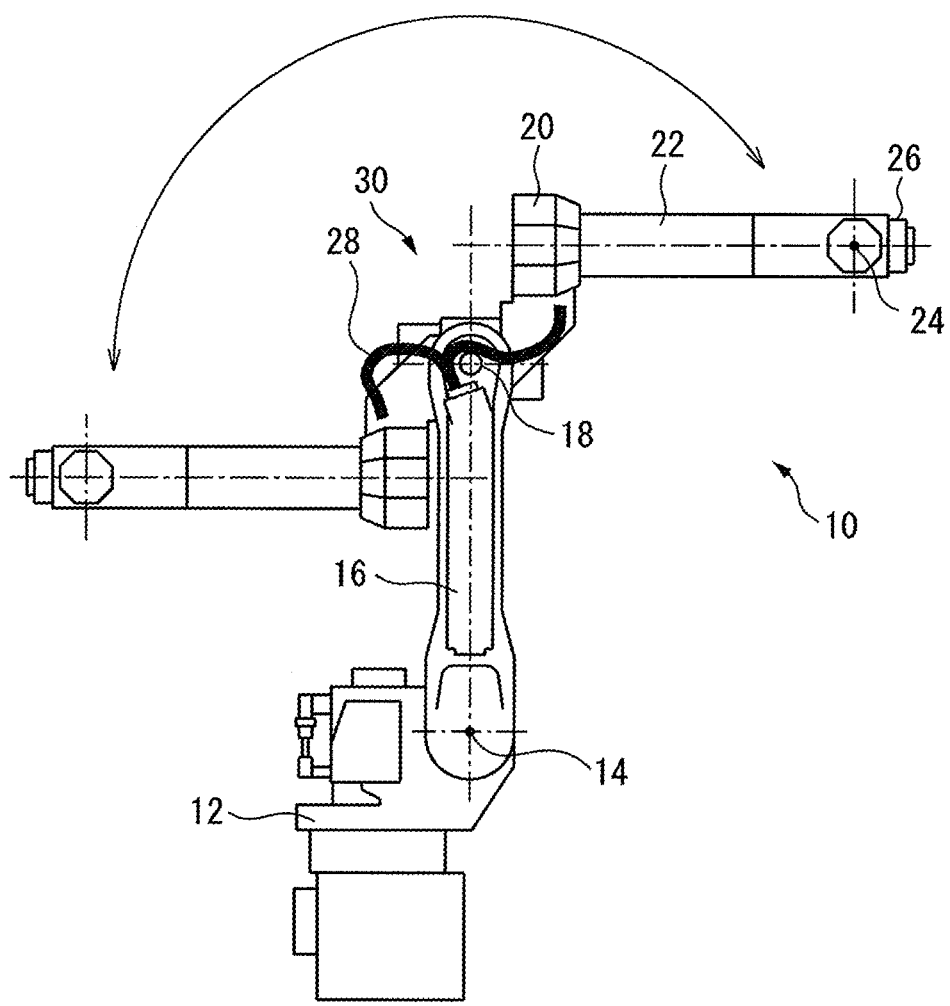
FIG. 3 shows an example in which a motion range of a forearm of the robot is larger than that of FIG. 1.

FIG. 3 shows an example in which the motion range (or the range of rotation angle) of forearm 22 relative to upper arm 16 of robot 10 as shown in FIG. 1 is expanded (or changed) to the second motion range. As a concrete means for changing the motion range of forearm 22, the position of at least one of physical stoppers 32 and 34 can be changed, otherwise, at least one of the physical stoppers can be replaced with another stopper having a different shape. In the example of FIG. 3, the motion range of forearm 22 relative to upper arm 16 is expanded towards the rear side (or the left side) of the robot.

Figure 4B:
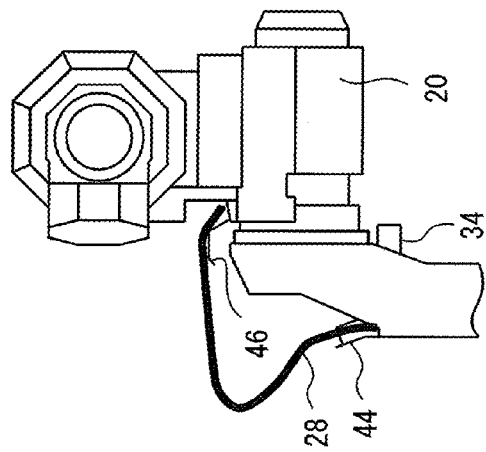
FIGS. 4a to 4c are respectively front, side and top views of a joint structure of the robot of FIG. 3.
Figure 4C:
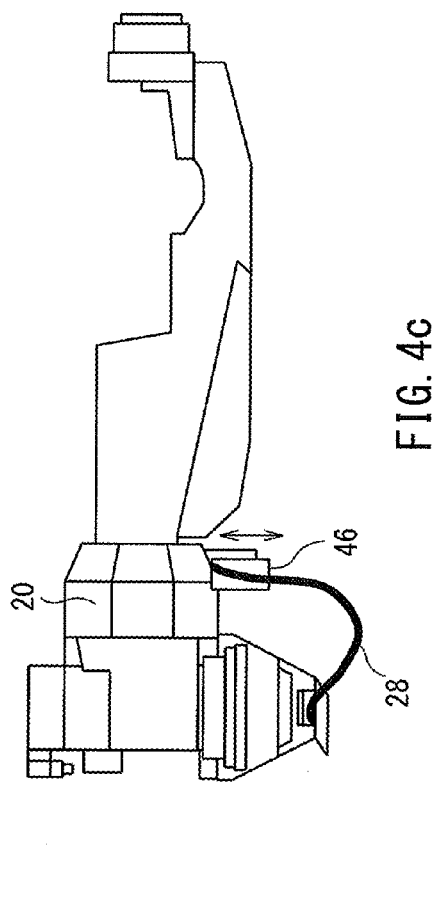
Figure 4A:
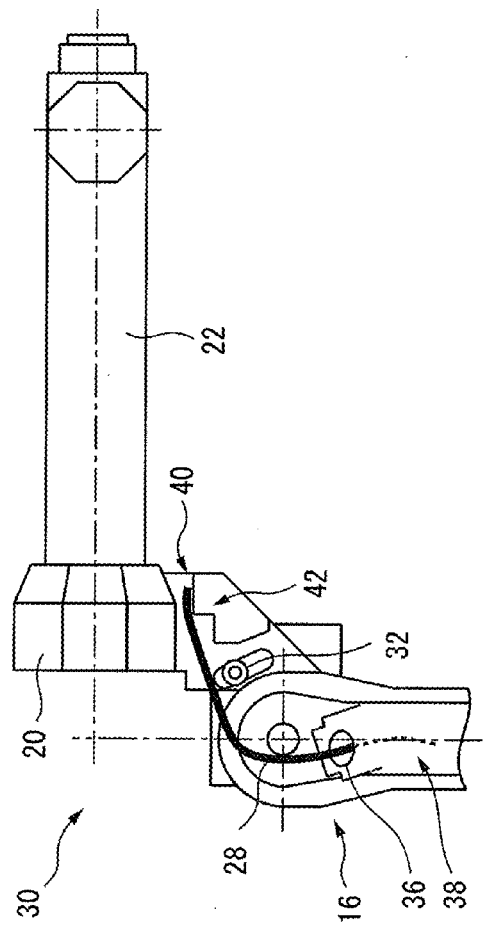

FIGS. 4a to 4c shows a front view (4a), a side view (4b) and a top view (4c) of the joint structure of robot 10 as shown in FIG. 3, respectively. As explained above, on at least one of upper arm 16 and forearm 22, containing section 38 or 42 is formed for containing the length portion of umbilical member 28 which is required to adjust (or extend) the margin of length of the umbilical member. Therefore, the operator can previously adjust the margin of length required in the case of FIG. 3, before robot 10 is operated, by withdrawing umbilical member 28 from the containing section.

As shown in FIG. 2b or 4b, it is preferable that a first fixing member 44, such as a clamp for fixing umbilical member 28, be arranged on the lateral side of the upper section (near the forearm) of upper arm 16. Also, as shown in FIG. 2c or 4c, it is preferable that a second fixing member 46, such as a clamp for fixing umbilical member 28, be arranged on the lateral side of forearm base 20. By virtue of these fixing members, umbilical member 28 can stably behave or move when forearm 22 is rotated.

Further, comparing FIGS. 2c and 4c, it is preferable that at least one of the position and orientation (or the attaching direction) of second fixing member 46 arranged on the lateral side of forearm base 20 be changeable or adjustable. When at least one of the positon and orientation of second fixing member 46 is changeable or adjustable, a route of umbilical member 28 around joint structure 30 can be optimized, as well as the margin of length.

Figure 5:
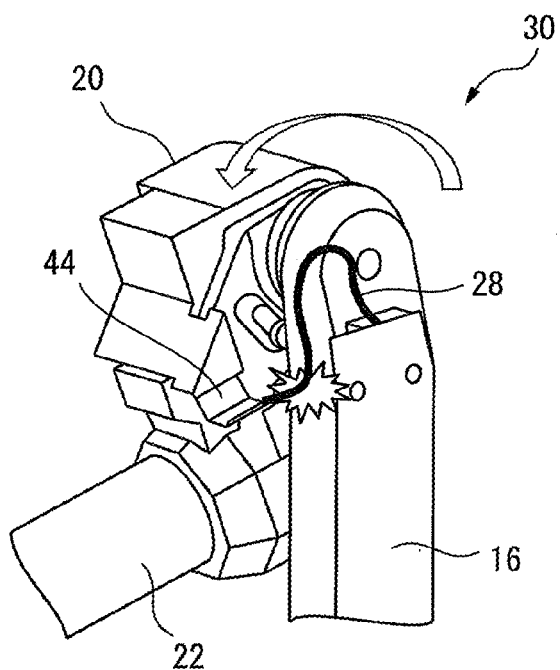
FIG. 5 is a perspective view showing the joint structure of FIG. 1.

For example, as shown in FIG. 2c, when the motion range of forearm 22 is relatively small, the orientation of second fixing member 46 can be changed so that the length of umbilical member 28 between first fixing member 44 and second fixing member 46 is relatively short. However, when the motion range of forearm 22 is expanded (i.e., the margin of length of umbilical member 28 is also lengthened) from this state, umbilical member 28 may be caught or involved in joint structure 30, depending on the rotation angle of forearm 22, as exemplified in FIG. 5.

Figure 6:
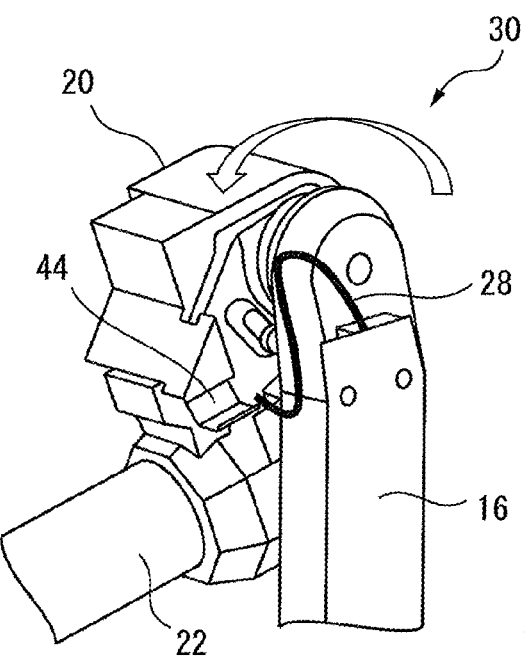
FIG. 6 is a perspective view showing the joint structure of FIG. 3.

Therefore, as shown in FIG. 4c, when the motion range of forearm 22 is relatively large, by changing the orientation of second fixing member 46 so that umbilical member 28 extends from second fixing member 46 in a direction (the horizontal direction in FIG. 4c) perpendicular to the longitudinal direction of forearm 22, umbilical member 28 can be prevented from being caught or involved in joint structure 30, as exemplified in FIG. 6. In this regard, "adjusting (or changing) at least one of the position and orientation of fixing member 46" may include changing the position and orientation of umbilical member 28 relative to a body of fixing member 46 and fixing umbilical member 28 by a clamp or cable tie, etc., so that umbilical member 28 cannot be moved relative to the body of fixing member 46, without changing the position and orientation of the body of fixing member 46.

As explained above, in the joint structure of the present invention, when the motion range of the forearm is expanded or increased by replacing the physical stopper or changing the position of the physical stopper, the margin of length required for the expanded motion range can be easily adjusted by using the umbilical member contained in the containing section or held on the lateral side of the upper arm or the forearm base.

On the other hand, when the motion range of the forearm is decreased, the margin of length required for the decreased motion range can be easily adjusted by containing an excess length portion of the umbilical member over the margin of length required for the decreased motion range in the containing section or by holding the excess length portion on the lateral side of the upper arm or the forearm base.

According to the present invention, in the joint structure between the upper arm and the forearm of the industrial robot, the length and/or the route of the umbilical member can be easily modified, depending on a change in the motion range of the forearm.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A joint structure of an industrial robot, the industrial robot comprising:
    an upper arm;
    a forearm having a forearm base rotatably connected to the upper arm; and
    an umbilical member extending from a lateral side of the upper arm and introduced to a lateral side of the forearm base,
    wherein a motion range of the forearm relative to the upper arm is variable,
    wherein the umbilical member has a margin of length corresponding to the motion range of the forearm, between the lateral side of the upper and the lateral side of the forearm base, and
    wherein the umbilical member has a length portion in addition to and adjacent to the margin of length for adjusting an overall length of the margin of length corresponding to a change in the motion range of the forearm, the length portion being contained in or held by the upper arm or the forearm base.

2. The joint structure as set forth in claim 1, wherein the joint structure comprises a first fixing member which fixes the umbilical member to an upper section of the lateral side of the upper arm, and a second fixing member which fixes the umbilical member to the lateral side of the forearm base.

3. The joint structure as set forth in claim 2, wherein the second fixing member is configured so that at least one of a position and orientation of the second fixing member relative to the forearm base can be adjusted.

4. The joint structure as set forth in claim 1, wherein the joint structure comprises a physical stopper which limits the motion range of the forearm relative to the upper arm, the physical stopper being configured to switch the motion range of the forearm between a first motion range and a second motion range wider than the first motion range.

5. An industrial robot comprising the joint structure as set forth in claim 1.

6. The joint structure as set forth in claim 1, wherein the length portion of the umbilical member is contained in the upper arm or forearm.

* * * * *